US006778351B1

(12) United States Patent
Coffin et al.

(10) Patent No.: US 6,778,351 B1
(45) Date of Patent: Aug. 17, 2004

(54) SYSTEM AND METHOD OF REDUNDANT CABLING IN A MEDIA STORAGE SYSTEM

(75) Inventors: Paul C Coffin, Fort Collins, CO (US); Robert L Mueller, Windsor, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 391 days.

(21) Appl. No.: 09/861,455

(22) Filed: May 18, 2001

(51) Int. Cl.⁷ ............................................ G11B 15/68
(52) U.S. Cl. ...................................................... 360/92
(58) Field of Search .......................... 369/36.01, 34.01, 369/30.01, 30.06, 192; 360/92, 98.06

(56) References Cited

U.S. PATENT DOCUMENTS

| 2,940,068 | A | * | 6/1960 | Stiefel ........................ 360/88 |
| 3,300,572 | A | | 1/1967 | Dahlgren et al. |
| 3,488,430 | A | * | 1/1970 | Holzhauser .................. 174/69 |
| 3,490,616 | A | * | 1/1970 | Castaldi ...................... 414/273 |
| 4,864,438 | A | | 9/1989 | Munro ........................ 360/92 |
| 4,923,053 | A | * | 5/1990 | Daniels ...................... 187/413 |
| 5,101,387 | A | | 3/1992 | Wanger et al. ................ 369/36 |
| 5,175,398 | A | * | 12/1992 | Hofmann .................... 174/169 |
| 5,427,489 | A | | 6/1995 | Chalmers et al. ........... 414/277 |
| 5,429,470 | A | | 7/1995 | Nicol et al. ................. 414/331 |
| 5,431,520 | A | | 7/1995 | Brugger ..................... 414/277 |
| 5,455,810 | A | | 10/1995 | Luffel .......................... 369/36 |
| 5,544,146 | A | | 8/1996 | Luffel et al. ................ 369/178 |
| 5,669,749 | A | * | 9/1997 | Danielson et al. .......... 414/280 |
| 5,721,716 | A | | 2/1998 | Luffel et al. .................. 369/36 |
| 5,781,367 | A | | 7/1998 | Searle et al. |
| 5,818,723 | A | | 10/1998 | Dimitri ................... 364/478.02 |
| 5,906,507 | A | * | 5/1999 | Howard ...................... 439/501 |
| 5,936,796 | A | | 8/1999 | Haneda ....................... 360/92 |
| 6,038,490 | A | | 3/2000 | Dimitri et al. .............. 700/214 |
| 6,059,509 | A | | 5/2000 | Ostwald ..................... 414/277 |
| 6,160,786 | A | | 12/2000 | Coffin et al. ................ 369/178 |
| 6,183,053 | B1 | | 2/2001 | Foslien et al. ........... 312/265.6 |
| 6,194,664 | B1 | * | 2/2001 | Zamora et al. .......... 174/117 F |
| 6,215,315 | B1 | * | 4/2001 | Maejima ..................... 324/539 |
| 6,231,291 | B1 | | 5/2001 | Mueller et al. ............. 414/277 |

FOREIGN PATENT DOCUMENTS

| DE | 19517661 A | 11/1996 |
| EP | 0351221 A | 1/1990 |
| EP | 0377474 A2 | 7/1990 |
| EP | 0416942 A2 | 3/1991 |
| EP | 1052637 A1 | 11/1999 |
| JP | 56-124159 A | 9/1981 |
| JP | 62-213948 A | 9/1987 |
| JP | 3-10780 A | 1/1991 |
| JP | 11073708 A | 3/1999 |
| WO | WO 86/06050 | 10/1986 |

OTHER PUBLICATIONS

U.S. patent application Ser. No. 09/179,793, filed Oct. 27, 1998 for Mail Slot Data Cartridge Exchange System for Use With a Data Storage System of Nicholas D. Thayer, Robert W. Luffel, David P. Jones, and Mark A. Smith.

U.S. patent application Ser. No. 09/257,322, filed Feb. 25, 1999 for Data Cartridge Exchange Apparatus of Robert L. Mueller, David P. Jones, Robert W. Luffel, and Mark A. Smith.

U.S. patent application Ser. No. 09/311,831, filed May 13, 1999 for Modular Data Storage System With Expandible Vertical Lift Mechanism of Joseph M. White.

IBM Technical Disclosure Bulletin, "Moving Rack Automated Library For Removable Data Storage Media", vol. 36 No. 09A, Sep. 1993, pp. 119–120.

* cited by examiner

*Primary Examiner*—A. J. Heinz
*Assistant Examiner*—Angel Castro
(74) *Attorney, Agent, or Firm*—Hewlett-Packard

(57) ABSTRACT

A media picker assembly includes a frame, a plunge assembly operable to travel along a predetermined axis of the frame to engage and disengage a media cartridge, and first and second cables coupled to the frame for transmitting first and second predetermined sets of signals, respectively.

21 Claims, 4 Drawing Sheets

US 6,778,351 B1

SYSTEM AND METHOD OF REDUNDANT CABLING IN A MEDIA STORAGE SYSTEM

TECHNICAL FIELD OF THE INVENTION

This invention relates to data storage systems for handling and storing data cartridges, and more particularly, to redundancy systems and methods to improve the reliability and speed of the data storage system.

BACKGROUND OF THE INVENTION

Many different types of data storage systems exist and are being used to store data cartridges at known locations and to retrieve desired data cartridges so that data may be written to or read from the data cartridges. Such data storage systems are often referred to as "juke box" data storage systems, particularly if they can accommodate a large number of individual data cartridges.

A typical juke box data storage system may include one or more different types of cartridge receiving devices for holding the various data cartridges. For example, one type of cartridge receiving device may include a cartridge storage rack or "magazine" while another type of cartridge receiving device may include a cartridge read/write device. The cartridge storage racks or magazines provide storage locations for the data cartridges and are often arranged so that they form one or more vertical stacks, although other configurations are possible. The cartridge read/write device may be located at any convenient location within the data storage system.

The data storage system may also be provided with a moveable cartridge picker assembly or "picker" for transporting the data cartridges between the various cartridge receiving devices, e.g., between the cartridge storage racks and the cartridge read/write devices. A typical cartridge picker assembly or picker may also be provided with a cartridge plunge mechanism or "thumb" assembly for engaging the various data cartridges contained in the cartridge receiving devices and for drawing them into the picker. A picker positioning system associated with the cartridge picker assembly may be used to move the cartridge picker assembly along the various cartridge receiving devices.

Data storage systems of the type described above are usually connected to a host computer system which may be used to access or store data on the data cartridges. For example, if the host computer system issues a request for data contained on a particular data cartridge, a control system associated with the data storage system will actuate the picker positioning system to move the picker assembly along the cartridge storage racks until the picker assembly is positioned adjacent the desired data cartridge. The cartridge plunge mechanism or "thumb" assembly associated with the picker assembly may then remove the data cartridge from the cartridge storage rack and draw it into the picker assembly. The picker positioning system may then be actuated to move the picker assembly to the appropriate cartridge read/write device. Once properly positioned adjacent the cartridge read/write device, the thumb assembly may insert the selected data cartridge into the cartridge read/write device so that the host computer may thereafter read data from or write data to the data cartridge. After the read/write operation is complete, the thumb assembly may be actuated to remove the data cartridge from the cartridge read/write device. The picker assembly may thereafter return the data cartridge to the appropriate location in the cartridge storage rack.

SUMMARY OF THE INVENTION

In one embodiment of the present invention, a media picker assembly includes a frame, a plunge assembly operable to travel along a predetermined axis of the frame to engage and disengage a media cartridge, and first and second cables coupled to the frame for transmitting first and second predetermined sets of signals, respectively.

In another embodiment of the present invention, a media storage system includes a media cartridge picker assembly operable to traverse along a predetermined path, and first and second cables coupled to the media cartridge picker assembly for transmitting first and second predetermined sets of signals, respectively. The first cable coupling the media cartridge picker assembly to a first point proximate to the first end of the path and the second cable coupling the media cartridge picker assembly to a second point proximate to the second end of the path.

In yet another embodiment of the present invention, a method includes the steps of monitoring a predetermined signal value carried in an active cable coupled to a media cartridge picker assembly of a multi-layer media storage system, switching a standby cable coupled to the media cartridge picker assembly to active status in response to the predetermined signal value being different from an expected signal value, and switching the active cable to standby status.

BRIEF DESCRIPTION OF THE DRAWINGS

For a more complete understanding of the present invention, the objects and advantages thereof, reference is now made to the following descriptions taken in connection with the accompanying drawings in which.

DESCRIPTION OF THE DRAWINGS

The preferred embodiment of the present invention and its advantages are best understood by referring to FIGS. 1 through 5 of the drawings, like numerals being used for like and corresponding parts of the various drawings.

Figure 1:
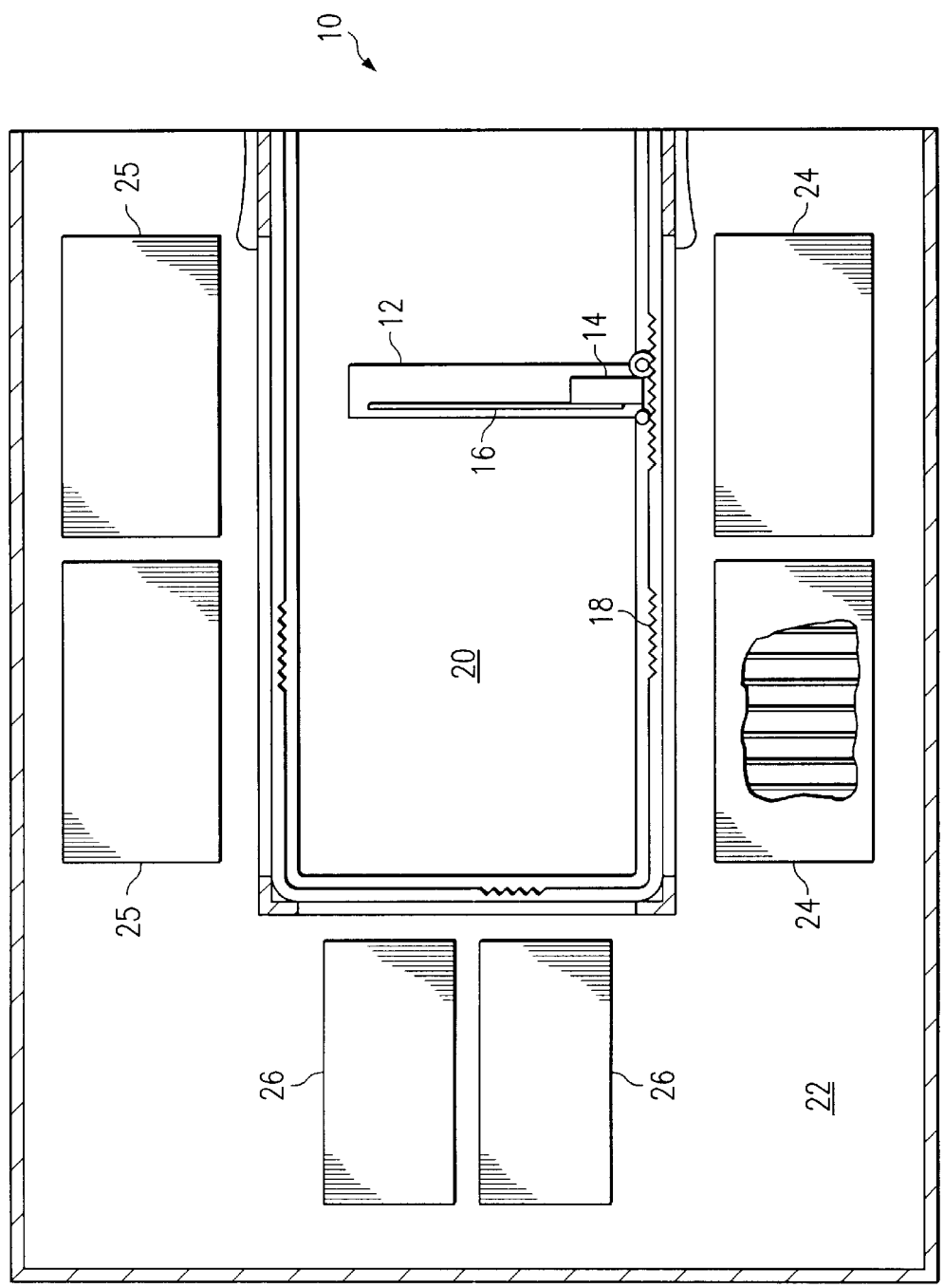
FIG. 1 is a simplified plan view of a media storage device having media storage racks, media access drives, and a data cartridge picker assembly.
Figure 2:
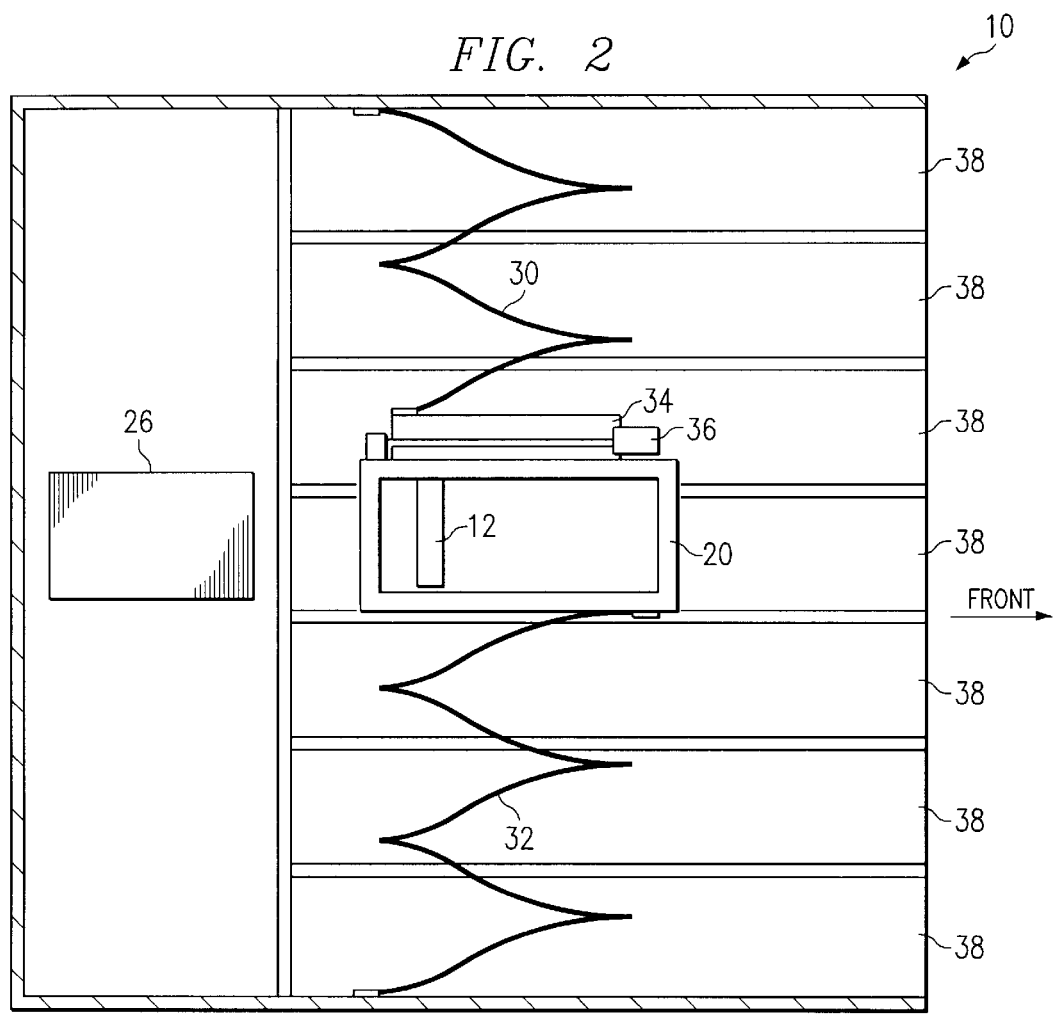
FIG. 2 is a simplified side view of a portion of a media storage device having a data cartridge picker assembly with redundant umbilical cables according to the teachings of the present invention.

FIG. 1 is a simplified plan view of a media storage device 10. Media storage device 10 includes a data cartridge picker assembly 12 with a cartridge plunge assembly 14 that is operable to travel along a guide 16 to move to and away from a data cartridge access end of picker assembly 12. In an embodiment shown in FIG. 1, picker assembly 12 is further operable to move along a generally U-shaped guide 18 within a translate frame 20 of media storage device 10 to travel a generally U-shaped path to access data cartridges contained in storage racks or magazines 24 and 25 and to access media read/write device stacks 26. Rack and pinion drive assemblies (not shown) may be used to move cartridge plunge assembly along guide 16 as well as along guide 18. As shown in FIG. 2, multiple layers of data storage magazine bays 38 and read/write drive bays 26 are stacked on top of one another to form a tower. Picker/translate frame assembly 20 further includes a lift motor 36 and rack and pinion (not shown) for vertical displacement to access the multiple vertically stacked layers.

Autochanger media storage devices of the type shown and described herein are well known. Details related to exemplary mechanisms for vertical, lateral and plunging axes of displacement are well known and are described, for example, in U.S. Pat. No. 5,596,556 to Luffel et al. and assigned to Hewlett-Packard Company. Details related to exemplary mechanisms for a cartridge plunge mechanism are described, for example, in U.S. Pat. No. 6,104,693 issued to Coffin et al. and assigned to Hewlett-Packard Company. Details related to exemplary mechanisms for a thumb reference and drive mechanism are described, for example, in U.S. Pat. No. 6,157,513 issued to Coffin et al. and assigned to Hewlett-Packard Company.

FIG. 2 is a simplified side view of a portion of a media storage device 10 having a data cartridge picker assembly 12 accessing multiple drive module bays 26 and multiple data magazine bays 38. Picker assembly 12 includes a cartridge plunge assembly 14 that is capable of horizontal displacement within picker assembly 12 to access data cartridges to and from magazine bays 38 and drive module bays 26. Picker assembly 12 includes redundant umbilical cables 30 and 32 according to the teachings of the present invention. Upper umbilical cable 30 may be attached to a point on the media storage housing at or near the upper reaches of translate frame 20. Lower umbilical cable 32 may be attached to a point on the media storage housing at or near the lower reaches of translate frame 20. Umbilical cables 30 and 32 are preferably self-retracting such as a Z-fold cable which automatically folds to take up slack in the cable. For example, as picker assembly 12 moves up, slack in upper umbilical cable 30 is folded into storage tray 34 disposed on top of picker assembly 12; as picker assembly 12 moves down, slack in lower umbilical cable 32 is folded and collected onto the bottom floor. Although the description and drawings herein assume vertical displacement of the picker assembly, different picker configurations are possible. For example, the picker assembly may travel in a horizontal axis to reach the media cartridge bays.

Umbilical cables 30 and 32 preferably carry identical signals to and from translate frame assembly 20, such as power, ground, status signals, control signals, etc. Umbilical cables 30 and 32 preferably operate in active/standby modes. When the active umbilical cable is severed or malfunctions, the standby cable is immediately brought into active mode so that normal operations continue with minimal interruption. The detection of cable malfunction or severance may be achieved by monitoring one or more predetermined signals that are maintained at constant or known voltages or values. Any variation in this detection signal may indicate the presence of malfunction or cable breakage. In an embodiment of the present invention, a predetermined signal value may be generated by a media storage controller (not shown) and sent to picker assembly 12, which monitors its value. If the value of the detection signal is different from the expected value, then a cable breakage may be present. Picker assembly 12 also sends the detection signal back to the controller, which monitors its detection signal value for signs of cable malfunction and breakage. Detection of signal variation by either the picker assembly or the controller is indicative of the need to switch to the redundant backup cable.

Figure 3:
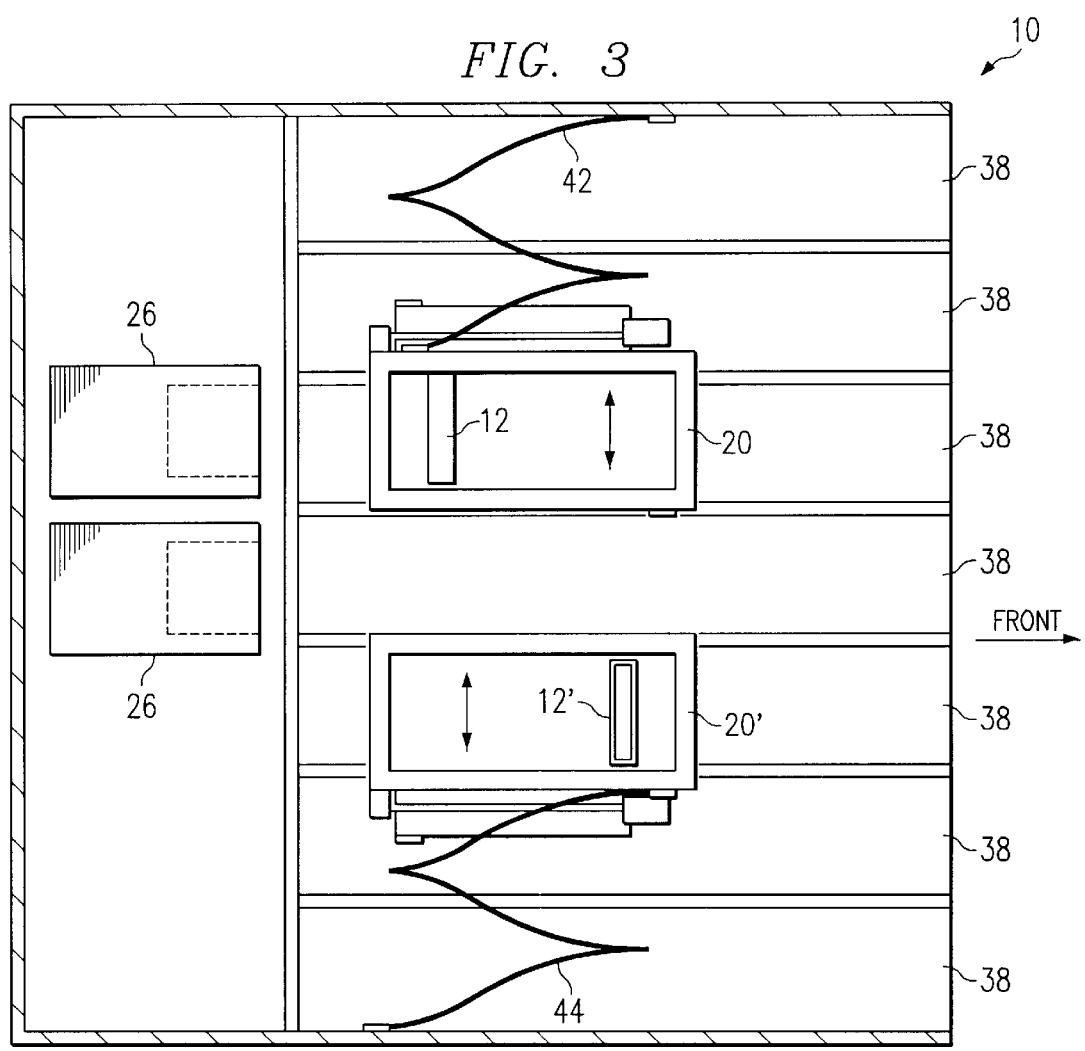
FIG. 3 is a simplified side view of a portion of a media storage device having an embodiment of dual data cartridge picker assemblies according to the teachings of the present invention.

FIG. 3 is a simplified side view of a portion of media storage device 10 with an embodiment of dual data cartridge picker assemblies 12 and 12' according to the teachings of the present invention. Upper picker assembly 12 and lower picker assembly 12' may be of identical construction and functionality. Picker assembly 12 includes a cartridge plunge mechanism and a Z-fold umbilical cable 42 attached to a high point on picker translator frame 20. Similarly, picker assembly 12' includes a cartridge plunge mechanism and a Z-fold umbilical cable 44 coupled to a low point on the picker translator frame 20'. Picker assemblies 12 and 12' are capable of operating independently and in a coordinated manner together to access the media cartridges. As picker assembly 12 moves up, slack in upper umbilical cable 42 is folded into a storage tray (not shown) disposed on top of picker assembly 12. As picker assembly 12' moves down, slack in lower umbilical cable 44 is folded and collected onto the bottom floor of picker translate frame. Other embodiments are possible. For example, cable self-retracting mechanisms may be used to gather up slack in the cable to prevent entanglement.

Figure 4:
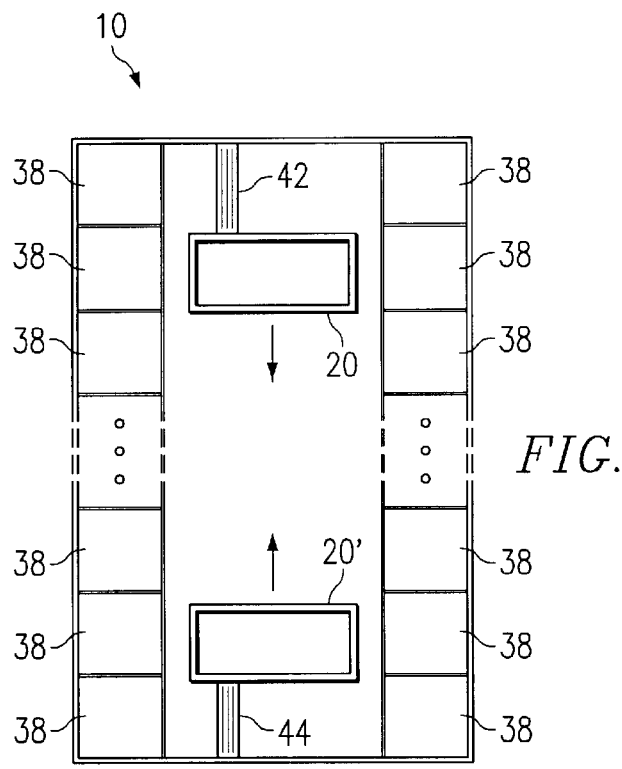
FIG. 4 is a simplified front view of a portion of a media storage device having an embodiment of dual data cartridge picker assemblies according to the teachings of the present invention.
Figure 5:
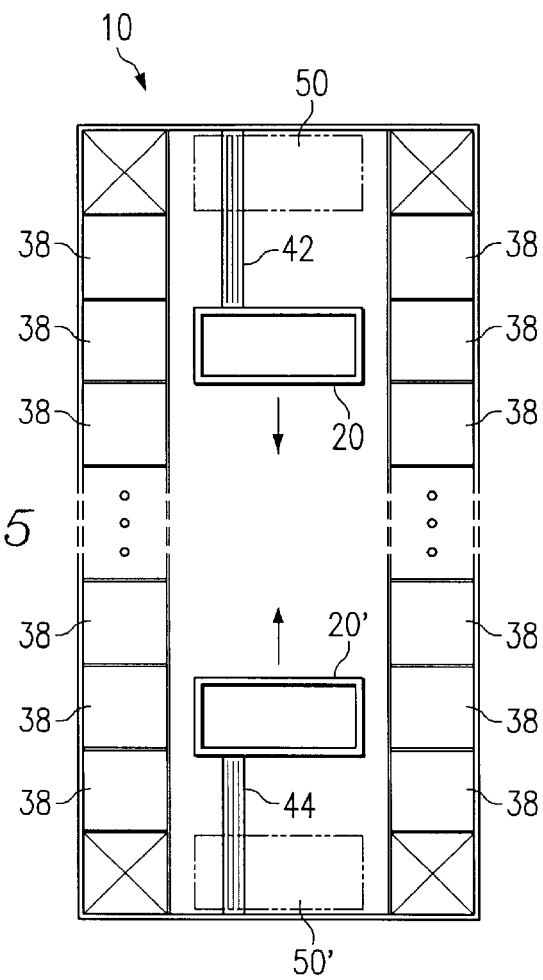
FIG. 5 is a simplified front view of a portion of a media storage device having an embodiment of dual data cartridge picker assemblies according to the teachings of the present invention.

FIGS. 4 and 5 are simplified front views of two exemplary embodiments of a portion of media storage device 10 having dual data cartridge picker assemblies according to the teachings of the present invention. In the embodiment shown in FIG. 5, an upper picker parking area 50 and a lower picker parking area 50' additionally provide docking spaces to upper and lower picker assemblies 20 and 20', respectively, when either picker assembly is not in use. When parked in one of the parking areas 50 or 50', the inactive picker assembly is out of the range of the active picker assembly and thereby not obstructing its access to any media storage cartridge bay. Parking areas 50 and 50' may be any available space that a malfunctioning picker assembly may retreat to and not obstruct the access to any media storage bay or drive module bays.

In a preferred embodiment, both picker assemblies 12 and 12' operate together to access media storage cartridges in a less time. Upper picker assembly 12 may be assigned to the upper media storage cartridges and lower picker assembly 12' may be assigned to the lower media storage cartridges. Because each picker assembly is closer to its destination, media access is speeded up. Furthermore, if a picker assembly experiences fault or malfunction, it may automatically return to its respective parking area so that the remaining picker assembly may continue to operate to cover the entire range of media storage bays without any service interruption. Alternatively, the picker assemblies may operate in active/standby mode during normal operations.

What is claimed is:

1. A media picker assembly, comprising:

a frame;

a plunge assembly operable to travel along a predetermined axis of the frame to engage and disengage a media cartridge; and first and second cables coupled to the frame for communicating first and second predetermined sets of signals with the plunge assembly, respectively, wherein the first and second cables are coupled to opposing sides of the frame.

2. The media picker assembly, as set forth in claim 1, wherein the first and second cables are Z-fold cables.

3. The media picker assembly, as set forth in claim 1, wherein the first and second cables are operable to automatically take up slack therein.

4. The media picker assembly, as set forth in claim 1, wherein the first and second cables are redundant cables that communicate identical signals.

5. The media picker assembly, as set forth in claim 1, wherein the first and second cables transmit identical power and control signals.

6. A media storage system, comprising:
a media cartridge picker assembly operable to traverse along a predetermined path having first and second ends;
first and second cables coupled to the media cartridge picker assembly for transmitting first and second predetermined sets of signals, respectively; and
the first cable coupling the media cartridge picker assembly to a first point proximate to the first end of the path and the second cable coupling the media cartridge picker assembly to a second point proximate to the second end of the path.

7. The media storage system, as set forth in claim 6, wherein the first and second cables are coupled to opposing sides of the media cartridge picker assembly.

8. The media storage system, as set forth in claim 6, wherein the first and second cables are Z-fold cables coupled to opposing sides of the media cartridge picker assembly.

9. The media storage system, as set forth in claim 6, wherein the first and second cables are operable to automatically take up slack therein.

10. The media storage system, as set forth in claim 6, wherein the first and second cables are redundant cables that transmit identical signals.

11. The media storage system, as set forth in claim 6, wherein the first and second cables transmit identical power and control signals.

12. The media storage system, as set forth in claim 6, further comprising a plurality of layers of media cartridges accessible by the media cartridge picker assembly.

13. A method, comprising:
monitoring a predetermined signal value carried in an active cable coupled to a media cartridge picker assembly of a multi-layer media storage system;
switching a standby cable coupled to the media cartridge picker assembly to active status in response to the predetermined signal value being different from an expected signal value; and
switching the active cable to standby status.

14. The method, as set forth in claim 13, wherein monitoring predetermined signal value comprises monitoring at least two predetermined signal values carried in the active cable.

15. The method, as set forth in claim 13, further comprising automatically taking up slack in the active and standby cables as the media cartridge picker assembly travels up and down to access multiple layers of media cartridges.

16. A media picker assembly, comprising:
a frame;
a plunge assembly operable to travel along a predetermined axis of the frame to engage and disengage a media cartridge; and
first and second cables coupled to the frame for communicating first and second predetermined sets of signals with the plunge assembly, respectively, wherein the first and second cables are operable to automatically take up slack therein, wherein slack in at least one of the first and second cables is folded into a storage tray associated with the media picker assembly.

17. A media storage system, comprising:
a first media cartridge picker assembly operable to traverse along a predetermined path having first and second ends;
a second media cartridge picker assembly operable to traverse along the predetermined path;
a first cable coupled to the first media cartridge picker assembly for transmitting a predetermined set of signals, the first cable coupling the first media cartridge picker assembly to a point proximate to the first end of the path; and
a second cable, the second cable coupled to the second media cartridge picker assembly for transmitting a predetermined set of signals, the second cable coupling the second media cartridge picker assembly to a point proximate to the second end of the path.

18. The media storage system, as set forth in claim 17, further comprising a storage tray disposed on the first media cartridge picker assembly, wherein slack in the first cable is automatically folded into the storage tray.

19. The media storage system, as set forth in claim 17, further comprising a plurality of layers of media cartridges accessible by each of the first and second media cartridge picker assemblies.

20. The media storage system, as set forth in claim 19, wherein each of said first and second media cartridge picker assemblies operate independently of the other to access said plurality of layers of media cartridges.

21. The media storage system, as set forth in claim 19, wherein each of said first and second media cartridge picker assemblies coordinate with each other to access said plurality of layers of media cartridges.

* * * * *